(12) United States Patent
Hwang et al.

(10) Patent No.: US 9,247,302 B2
(45) Date of Patent: Jan. 26, 2016

(54) METHOD AND APPARATUS FOR PROVIDING WIDGET INFORMATION USING AN MPEG-2 LAYER

(75) Inventors: Sung-Oh Hwang, Yongin-si (KR); Kyung-Mo Park, Seoul (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/008,111

(22) PCT Filed: Mar. 30, 2012

(86) PCT No.: PCT/KR2012/002383
§ 371 (c)(1),
(2), (4) Date: Sep. 27, 2013

(87) PCT Pub. No.: WO2012/134222
PCT Pub. Date: Oct. 4, 2012

(65) Prior Publication Data
US 2014/0020014 A1    Jan. 16, 2014

(30) Foreign Application Priority Data
Apr. 1, 2011    (KR) .................. 10-2011-0030138

(51) Int. Cl.
*H04N 5/445*    (2011.01)
*H04N 21/478*   (2011.01)
*H04N 21/434*   (2011.01)
*H04N 21/81*    (2011.01)

(52) U.S. Cl.
CPC ......... *H04N 21/478* (2013.01); *H04N 21/4348* (2013.01); *H04N 21/8173* (2013.01)

(58) Field of Classification Search
CPC ............ H04N 21/8173; H04N 21/478; H04N 21/4348
USPC ................................. 725/32, 40, 51
See application file for complete search history.

(56) References Cited

U.S. PATENT DOCUMENTS

| | | | |
|---|---|---|---|
| 2003/0212995 A1* | 11/2003 | Kitamori | 725/41 |
| 2008/0163323 A1* | 7/2008 | Lee | 725/115 |
| 2010/0131981 A1 | 5/2010 | Choi | |
| 2011/0138281 A1* | 6/2011 | Lai et al. | 715/716 |
| 2011/0173602 A1* | 7/2011 | Togami et al. | 717/173 |
| 2011/0258673 A1* | 10/2011 | Matsubara et al. | 725/109 |
| 2012/0253662 A1* | 10/2012 | Iguchi et al. | 701/428 |

FOREIGN PATENT DOCUMENTS

| | | |
|---|---|---|
| JP | 2010-004498 A | 1/2010 |
| KR | 10-0838247 B1 | 6/2008 |
| WO | 2010/077123 A2 | 7/2010 |

* cited by examiner

*Primary Examiner* — Pankaj Kumar
*Assistant Examiner* — Sahar Baig
(74) *Attorney, Agent, or Firm* — Jefferson IP Law, LLP

(57) ABSTRACT

The present invention relates to a method for providing a widget service. More particularly, the present invention relates to a method for providing a widget service for a receiving device using a Moving Picture Experts Group (MPEG)-2 layer, the method comprising the steps of: receiving MPEG broadcast data; loading a widget general information table (WGIT) stored in program specific information (PSI) of the MPEG broadcast data; loading the information indicated by a widget information table (WIT) of the WGIT; and generating a widget using the information indicated by the WIT.

8 Claims, 3 Drawing Sheets

METHOD AND APPARATUS FOR PROVIDING WIDGET INFORMATION USING AN MPEG-2 LAYER

BACKGROUND OF THE INVENTION

1. Field of the Invention

The present invention relates to a method and apparatus for providing widget information in a system using Moving Picture Experts Group Program Specific Information (MPEG PSI), Advanced Television Systems Committee Program and System Information Protocol (ATSC PSIP), and Digital Video Broadcasting (DVB) Program Specific Information/ Service Information (PSI/SI).

2. Description of the Related Art

The recent multimedia service is simultaneously providing a supplementary service such as a widget form to a user, together with a main service provided.

If a widget service is provided to a real-time provided service, for example, a broadcast service, a service provider can additionally provide various supplementary services related to the broadcast service.

Accordingly, a method and apparatus for providing the widget service to the real-time broadcast service are needed.

SUMMARY OF THE INVENTION

An aspect of the present invention is to substantially solve at least the above problems and/or disadvantages and to provide at least the advantages below. Accordingly, one aspect of the present invention is to provide a method and apparatus for providing widget information using an MPEG-2 layer.

Another aspect of the present invention is to provide a method and apparatus for connecting a main service and a widget service by using MPEG PSI.

A further aspect of the present invention is to provide a method and apparatus capable of providing information by using a widget service.

The above aspects are achieved by providing a method and apparatus for providing widget information using an MPEG-2 layer.

According to one aspect of the present invention, a method for providing a widget service for a receiving device using a Moving Picture Experts Group (MPEG)-2 layer is provided. The method includes the operations of receiving MPEG broadcast data, loading a Widget General Information Table (WGIT) stored in Program Specific Information (PSI) of the MPEG broadcast data, loading information indicated by a Widget Information Table (WIT) of the WGIT, and generating a widget by using the information indicated by the WIT.

According to another aspect of the present invention, a method for providing a widget service for a transmitting device using an MPEG-2 layer is provided. The method includes the operations of generating a WGIT and a WIT for a widget service, adding the generated WGIT and WIT to MPEG PSI and completing MPEG data, and broadcasting the completed MPEG data.

According to a further aspect of the present invention, a receiving device of providing a widget service by using an MPEG-2 layer is provided. The receiving device includes a modem for communicating with other nodes, a control unit receiving MPEG broadcast data through the modem, loading a WGIT stored in PSI of the MPEG broadcast data, loading information indicated by a WIT of the WGIT, and generating a widget by using the information indicated by the WIT, and a storage unit storing the WGIT and WIT.

According to a yet another aspect of the present invention, a transmitting device for providing a widget service by using an MPEG-2 layer is provided. The transmitting device includes a modem for communicating with other nodes, a control unit generating a WGIT and a WIT for a widget service, adding the generated WGIT and WIT to MPEG PSI and completing MPEG data, and broadcasting the completed MPEG data through the modem, and a storage unit storing the WGIT and WIT.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
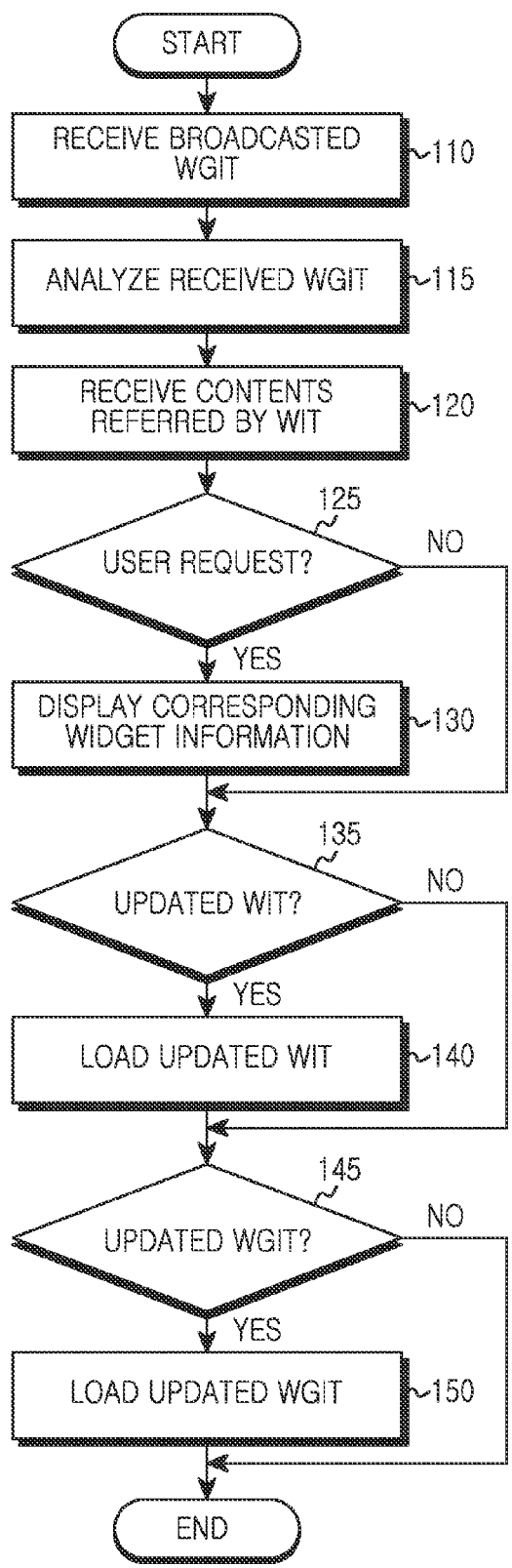
FIG. 1 is a flowchart illustrating an operation process of a receiving device for widget service provision according to an exemplary embodiment of the present invention.

Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Below, the present invention describes a method and apparatus for providing widget information using an MPEG-2 layer.

Table 1 shows a Widget General Information Table (WGIT) proposed in the present invention, and provides information about all widgets which are applied to provided service or contents.

A receiving device, i.e., a user's device acquires information about all widgets through the WGIT and then, receives information (for example, contents) about an additionally necessary widget from a corresponding server or device (transmitting device) and uses the received information.

TABLE 1

| | | |
|---|---|---|
| Widget General Information Table | | |
| Table ID | | |
| version info | | |
| Widget General Information Table Info | Retransmission period Server URL | |
| Widget Information Table Info | Widget information table 1 | WIT ID Version transmission time Repetition period Location $2^{nd}$ location |
| | Widget information table 2 | WIT ID Version |

TABLE 1-continued

| | |
|---|---|
| Widget information table n | transmission time |
| | Repetition period |
| | Location |
| | 2nd location |
| | WIT ID |
| | Version |
| | transmission time |
| | Repetition period |
| | Location |
| | 2nd location |

In Table 1 above, the 'Table ID' is an identifier capable of identifying the WGIT in PSI of an MPEG.

The 'Version info' is version information of the WGIT. When the version information of the WGIT has been changed, the receiving device previously receiving the WGIT can again receive a WGIT. When an arbitrary field value within the WGIT has been changed, the 'Version info' increases by '1'.

The 'Retransmission Period' provides information about a transmission period of the WGIT, and provides information about whether a user's terminal can again receive the WGIT at which time point.

The 'Server URL' represents an address of a server capable of acquiring the WGIT such that the receiving device can receive the WGIT through an interaction channel. The 'Server URL' can be used when the user's device needs to acquire the WGIT before a next reception time point of the WGIT.

In Table 1 above, the 'Widget Information Table Info' provides information about the respective widgets which are used for the service or contents provided to a user.

The 'Widget information table 1' is described by way of example. The 'WIT ID' is an identifier of a Widget Information Table (WIT), and the 'version' is version information of the WIT.

The 'Transmission time' is the first transmission time point of the WIT, and the 'Repetition period' provides a repetition transmission period of the WIT and informs a reception possibility time point of a WIT 1 required by the user's device.

The 'Location' provides information about a Transport Stream (TS) in which the WIT 1 is transmitted. By providing an address of a server capable of acquiring the WIT 1, when the user's device has a two-way communication function, the '$2^{nd}$ location' enables to acquire information about the WIT 1 before a transmission time point of the WIT 1. The 'Widget information table info' provides information about a WIT of up to 'n'.

Table 2 shows a structure of a Widget Information Table proposed in the present invention.

TABLE 2

| | | |
|---|---|---|
| Widget information Table | | |
| ID | | |
| Version info | | |
| Repetition Period | | |
| Widget General info | Widget ID | |
| | Widget name | |
| | Widget manufacturer | |
| | Widget kind | |
| | 1st location | |
| | 2nd location | |
| Widget application info | Service#1 | ID |
| | | Validity |
| | Service#2 | ID |
| | | Validity |
| | Service#3 | ID |
| | | Validity |

The 'ID' of Table 2 above is an identifier of the Widget information table, and the 'Version info' is version information of the WIT.

In the present invention, the user's device can acquire the version information of the WIT from the WGIT, but even the WIT provides the version information of the WIT in order to determine if the user's device acquires a right WIT.

The 'Repetition period' provides information about a transmission repetition period of the WIT.

The 'Widget general info' provides general information about the widget which the WIT provides information on, and includes the items as follows.

The 'Widget ID', a widget identifier, is an identifier allocated by a manufacturer or can be allocated by a service provider or a manager managing the widget.

The 'Widget name' is a name of the widget being identifiable by the user. The 'Widget manufacturer' represents a person who has made the widget. The 'Widget kind' represents the kind of the widget, for one example, represents the use of the widget such as a communicating widget, an announcing widget and the like.

The '$1^{st}$ location' provides information capable of, when a widget indicated by the WIT is transmitted through a transmitting device, acquiring the widget (for instance, it can be information of an MPEG TS, information about MPEG contents). The '$2^{nd}$ location' provides an address capable of acquiring the widget.

In Table 2 above, the 'widget application info' provides a list (service#1, service#2, and service#3) of services or contents for which the widget indicated by the WIT can be used.

Among these, the service#1 is described by way of one example. The 'ID' of the service#1 is a service identifier, and provides identifier information of a service for which the widget is used. The 'validity' of the service#1 represents the validity of the widget provided by the WIT and can enable the user's device to use the widget during a suitable time.

The WGIT and WIT are included in the PSI of the MPEG As long as the transmitting device, i.e., the service provider broadcasts MPEG data, the WGIT and WIT are broadcasted together with the MPEG broadcast data.

The transmitting device can update the WGIT and WIT according to need, and broadcast the updated WGIT and WIT.

FIG. 1 is a flowchart illustrating an operation process of a receiving device for widget service provision according to an exemplary embodiment of the present invention.

Referring to FIG. 1, the receiving device receives a WGIT included in PSI of MPEG broadcast data provided by a transmission side, i.e., a service provider (step 110). That is, the receiving device receives the MPEG broadcast data, and loads the WGIT from the PSI of the MPEG broadcast data. The WGIT is illustrated in Table 1 above.

Next, the receiving device analyzes the received WGIT (step 115). Upon WGIT analysis, the receiving device analyses even a WIT included in the WGIT, together.

After the analysis, the receiving device receives contents or information referred by the WIT from a corresponding device, based on the analysis result of the WGIT and WIT (step 120). The WIT is illustrated in Table 2 above.

Next, when there is a widget display request from a user (step 125), the receiving device generates a widget to be displayed, based on the received WGIT, WIT, and WIT referring contents, and displays the generated widget (step 130).

The process of generating the widget can include a process of arraying the contents referred by the WIT or the information indicated by the WIT in series or in parallel on a screen.

Next, the receiving device checks whether the WIT has been updated periodically or according to a request of a user or program and, when the WIT has been updated (step 135), the receiving device receives the updated WIT (step 140).

After that, the receiving device checks whether the WGIT has been updated periodically or according to a request of the user or program and, when the WGIT has been updated (step 145), the receiving device receives the updated WGIT (step 150).

If there is a change of version information within corresponding Table, the receiving device determines that the WIT and WGIT have been updated. And, a period by which the receiving device checks whether the WIT and WGIT have been updated follows the 'Retransmission period' of Table 1 and Table 2 above.

Figure 2:
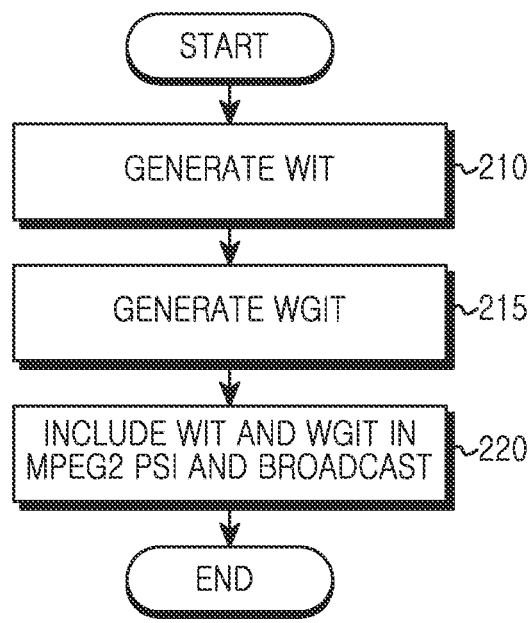
FIG. 2 is a flowchart illustrating an operation process of a transmitting device for widget service provision according to an exemplary embodiment of the present invention.

FIG. 2 is a flowchart illustrating an operation process of a transmitting device for widget service provision according to an exemplary embodiment of the present invention.

Referring to FIG. 2, a transmitting device, i.e., a service provider generates a WIT and a WGIT for a widget service (steps 210 and 215).

Next, the transmitting device includes the generated WGIT and WIT in MPEG PSI and broadcasts it (step 220).

In the broadcasting process, if there is a need for WGIT and WIT updating, the transmitting device performs updating for the WGIT and WIT, and updates even the version information, together. Next, the transmitting device includes the updated WGIT and WIT in the PSI and broadcasts it in a next period. The next period follows the 'Retransmission period' of Table 1 and Table 2 above.

Figure 3:
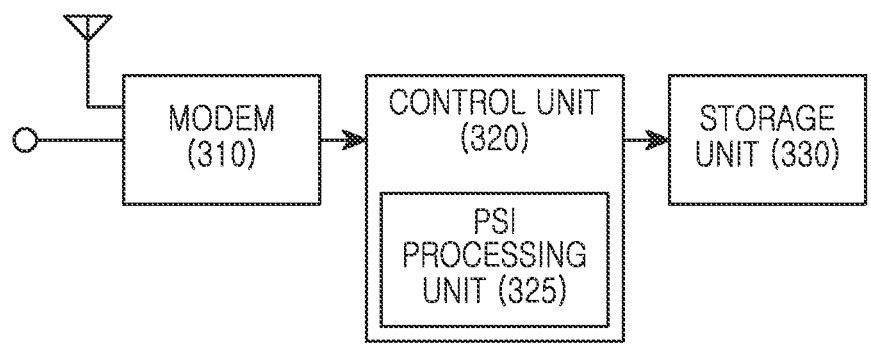
FIG. 3 is a block diagram illustrating constructions of a transmitting device and a receiving device for widget service provision according to an exemplary embodiment of the present invention.

FIG. 3 is a block diagram illustrating constructions of a transmitting device and a receiving device for widget service provision according to an exemplary embodiment of the present invention.

The receiving device is first described with reference to FIG. 3. The receiving device includes a modem 310, a control unit 320, and a storage unit 330. The control unit 320 includes a PSI processing unit 325. Though not illustrated in the drawings, the receiving device includes an input unit for receiving provision of a user input, and a display unit for outputting information to a user. Herein, it is assumed that the receiving device uses a wireless communication, but a communication technology of the receiving device is not limited to wired, wireless.

The modem 310, which is a module for communicating with other devices, includes a wireless processing unit, a baseband processing unit and the like. The wireless processing unit converts a signal received through an antenna into a baseband signal and provides the baseband signal to the baseband processing unit, and converts a baseband signal from the baseband processing unit into a wireless signal such that the wireless signal can be actually transmitted on a wireless path, and transmits the wireless signal through the antenna. In the present invention, a wireless access technology of the modem 310 is not limited.

The control unit 320 controls the general operation of the receiving device and, particularly, controls the PSI processing unit 325 according to the present invention.

The storage unit 330 performs a function of storing a program for controlling the general operation of the receiving device and temporary data generated during program execution.

The PSI processing unit 325 receives a WGIT included in PSI of MPEG broadcast data provided by a transmission side, i.e., a service provider. That is, the PSI processing unit 325 receives the MPEG broadcast data, and loads the WGIT from the PSI of the MPEG broadcast data. The WGIT is illustrated in Table 1 above.

Next, the PSI processing unit 325 analyzes the received WGIT. Upon WGIT analysis, the PSI processing unit 325 analyses even a WIT included in the WGIT, together.

After the analysis, the PSI processing unit 325 receives contents or information referred by the WIT from a corresponding device, based on the analysis result of the WGIT and WIT. The WIT is illustrated in Table 2 above.

Next, when there is a widget display request from a user, the PSI processing unit 325 generates a widget to be displayed, based on the received WGIT, WIT, and WIT referring contents, and displays the generated widget.

Next, the PSI processing unit 325 checks whether the WIT has been updated periodically or according to a request of a user or program and, when the WIT has been updated, the PSI processing unit 325 receives the updated WIT.

After that, the PSI processing unit 325 checks whether the WGIT has been updated periodically or according to a request of the user or program and, when the WGIT has been updated, the PSI processing unit 325 receives the updated WGIT.

If there is a change of version information within corresponding Table, the PSI processing unit 325 determines that the WIT and WGIT have been updated. And, a period by which the receiving device checks whether the WIT and WGIT have been updated follows the 'Retransmission period' of Table 1 and Table 2 above.

Henceforth, the transmitting device is described. The transmitting device includes a modem 310, a control unit 320, and a storage unit 330. The control unit 320 includes a PSI processing unit 325. Though not illustrated in the drawings, the transmitting device includes an input unit for receiving provision of a user input, and a display unit for outputting operation information of the transmitting device. Herein, it is assumed that the transmitting device uses a wired communication, but a communication technology of the transmitting device is not limited to wired, wireless.

The modem 310, which is a module for communicating with other devices, includes a wired processing unit, a baseband processing unit and the like. The wired processing unit converts a signal received through a wired path into a baseband signal and provides the baseband signal to the baseband processing unit, and converts a baseband signal from the baseband processing unit into a wired signal such that the wired signal can be actually transmitted on a wired path, and transmits the wired signal through the wired path. In the present invention, a wired communication technology of the modem 310 is not limited.

The control unit 320 controls the general operation of the transmitting device and, particularly, controls the PSI processing unit 325 according to the present invention.

The storage unit 330 performs a function of storing a program for controlling the general operation of the transmitting device and temporary data generated during program execution.

The PSI processing unit 325 generates a WIT and a WGIT for a widget service. The PSI processing unit 325 includes the generated WIT and WGIT in MPEG PSI and broadcasts it.

In the broadcasting process, if there is a need for WGIT and WIT updating, the PSI processing unit 325 performs updating for the WGIT and WIT, and updates even the version information, together. Next, the PSI processing unit 325 includes the updated WGIT and WIT in the PSI and broadcasts it in a next period. The next period follows the 'Retransmission period' of Table 1 and Table 2 above.

In the aforementioned block construction, the control unit 320 of each of the receiving device and the transmitting device can perform a function of the PSI processing unit 325 of each of the receiving device and the transmitting device. In the present invention, these are separately constructed and shown in order to distinguish and describe respective functions.

Accordingly, when a product is actually realized, the product can be constructed such that the control unit 320 can process all the functions of the PSI processing unit 325, or can be constructed such that the control unit 320 can process only some of the functions.

The present invention has an advantage of being capable of providing information necessary for a widget service by using MPEG PSI and, by providing the widget service, providing various services related to a real-time broadcast service upon providing the real-time broadcast service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for receiving a widget in a receiving apparatus of a multimedia system, the method comprising:
   receiving broadcast data;
   loading widget information indicated by a widget table stored in control information of the broadcast data; and
   generating a widget by using the widget information indicated by the widget table,
   wherein the widget table comprises:
      retransmission period information, which is a period in which update checking is performed, and
      address information of a server capable of acquiring the widget table,
   wherein, after the retransmission period is expired, the receiving apparatus updates the widget information if the widget table is updated, and
   wherein the receiving apparatus updates the widget information using the address information of the server if an event which needs the widget information occurs before a next reception time point of the retransmission period.

2. The method of claim 1, wherein the update checking checks whether the widget table is updated by checking whether version information comprised in the widget table is changed.

3. The method of claim 1, further comprising, if the receiving apparatus receives a widget display request, displaying the generated widget.

4. The method of claim 1, wherein the widget table further comprises information representing a widget table identifier, and information representing a version of the widget table.

5. A receiving apparatus for receiving a widget service in a multimedia system, the apparatus comprising:
   a modem configured to communicate with other nodes; and
   a control unit configured to receive broadcast data, to load widget information indicated by a widget table stored in control information of the broadcast data, and to generate a widget by using the widget information indicated by the widget table,
   wherein the widget table comprises:
      retransmission period information, which is a period in which update checking is performed, and
      address information of a server capable of acquiring the widget table,
   wherein, after the retransmission period is expired, the control unit is configured to update the widget information if the widget table is updated, and
   wherein the receiving apparatus updates the widget information using the address information of the server if an event which needs the widget information occurs before a next reception time point of the retransmission period.

6. The receiving apparatus of claim 5, wherein the control unit is further configured to check whether version information comprised in the widget table is changed.

7. The receiving apparatus of claim 5, wherein the control unit is further configured to display the generated widget if the receiving apparatus receives a widget display request.

8. The receiving apparatus of claim 5, wherein the widget table further comprises information representing a widget table identifier, and information representing a version of the widget table.

* * * * *